(12) United States Patent
Hara et al.

(10) Patent No.: US 8,025,947 B2
(45) Date of Patent: *Sep. 27, 2011

(54) OPTICAL INFORMATION RECORDING MEDIUM

(75) Inventors: Fumi Hara, Takasaki (JP); Takeshi Otsu, Takasaki (JP); Isao Matsuda, Takasaki (JP); Shingo Katoh, Takasaki (JP); Masashi Satoh, Takasaki (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 12/243,922

(22) Filed: Oct. 1, 2008

(65) Prior Publication Data

US 2009/0092783 A1 Apr. 9, 2009

(30) Foreign Application Priority Data

Oct. 5, 2007 (JP) .................................. 2007-261468

(51) Int. Cl.
*B32B 3/02* (2006.01)

(52) U.S. Cl. ..................... 428/64.1; 428/64.4; 428/64.8; 430/270.14

(58) Field of Classification Search .......................... None
See application file for complete search history.

(56) References Cited

U.S. PATENT DOCUMENTS

| 7,835,257 B2 * | 11/2010 | Hagiwara et al. ........... 369/275.3 |
| 2007/0190283 A1 * | 8/2007 | Imai et al. ..................... 428/64.4 |
| 2007/0231529 A1 | 10/2007 | Kariyada et al. |

FOREIGN PATENT DOCUMENTS

| JP | 2003-036562 A1 | 2/2003 |
| JP | 2006-147135 A1 | 6/2006 |

* cited by examiner

*Primary Examiner* — Elizabeth Mulvaney
(74) *Attorney, Agent, or Firm* — Law Offices of Katsuhiro Arai

(57) ABSTRACT

An optical information recording medium has a substrate, and an optical reflection layer, an optical recording layer containing an organic dye, an interlayer, and a cover layer formed in this order on the substrate. The interlayer contains a sputtered $Nb_2O_5$—$Al_2O_3$-based composite oxide having an $Nb_2O_5$ content of more than 50 mol % and less than 60 mol %.

7 Claims, 5 Drawing Sheets

[FIG. 1]
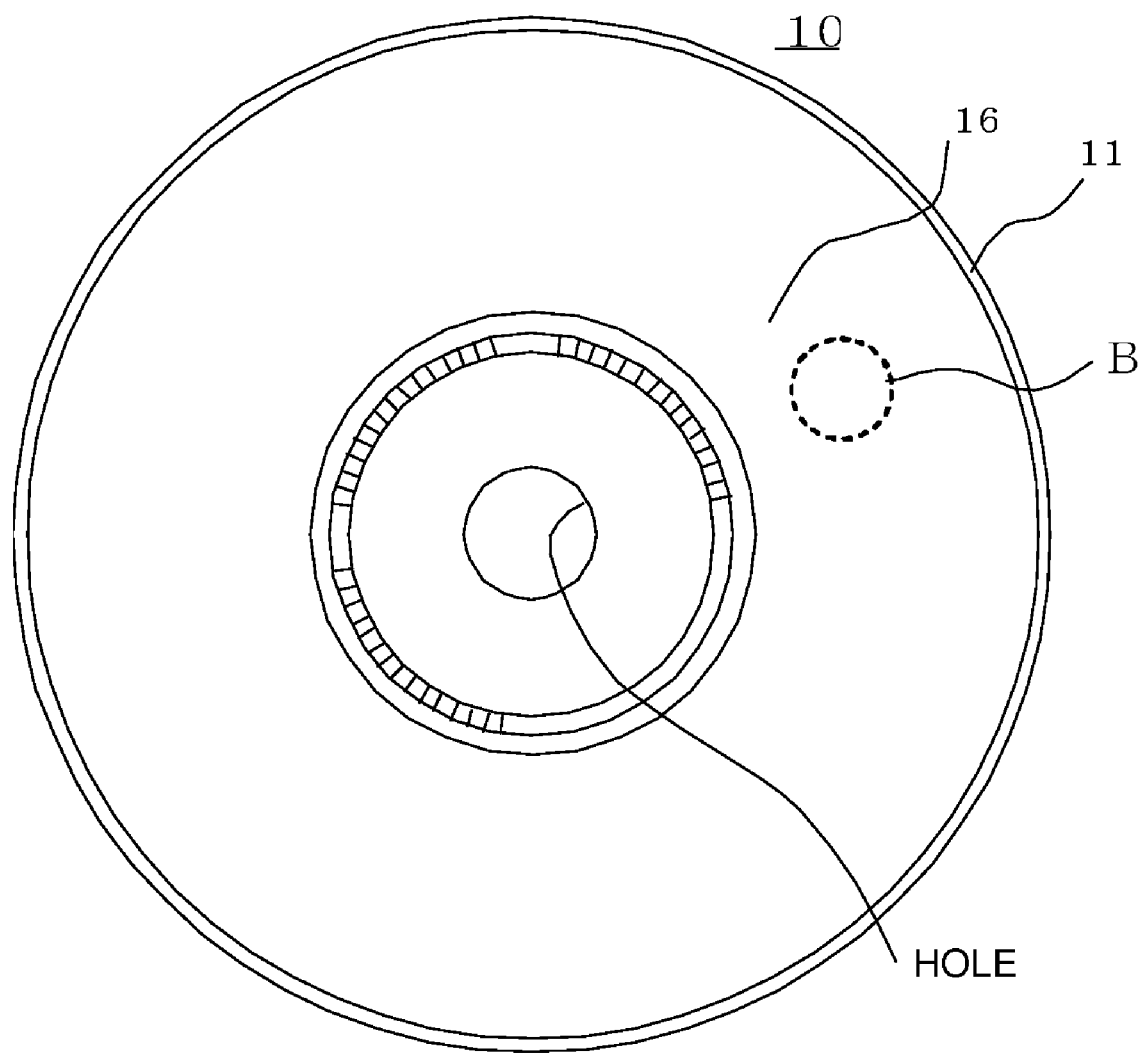

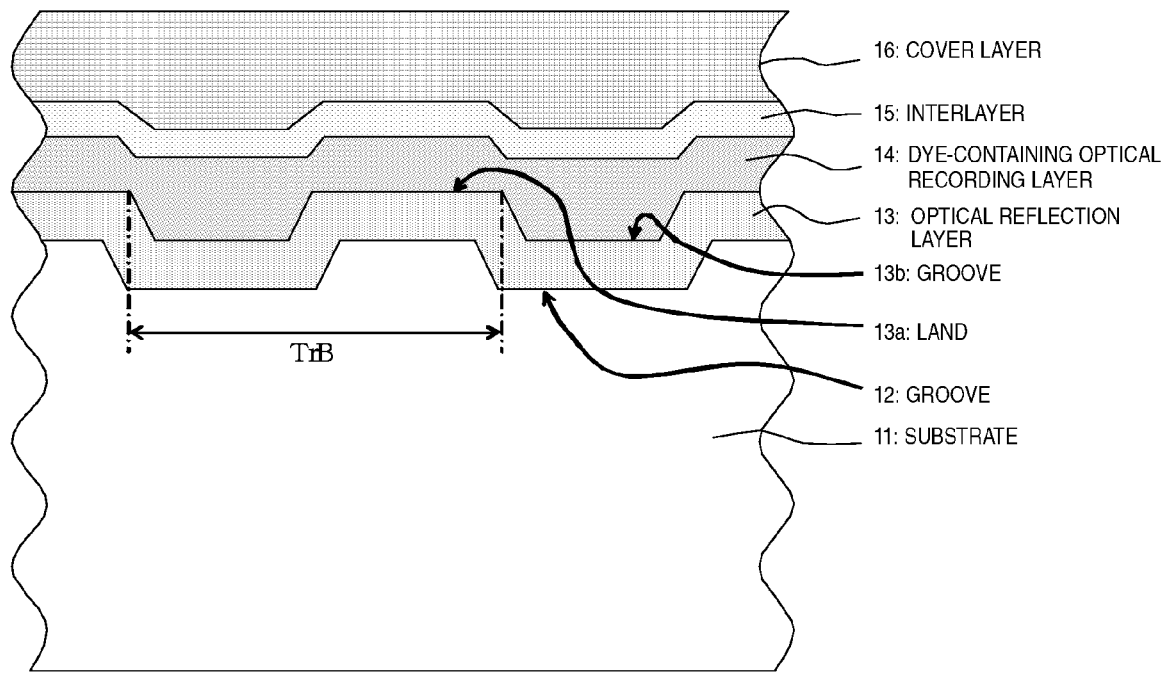

[FIG. 3]
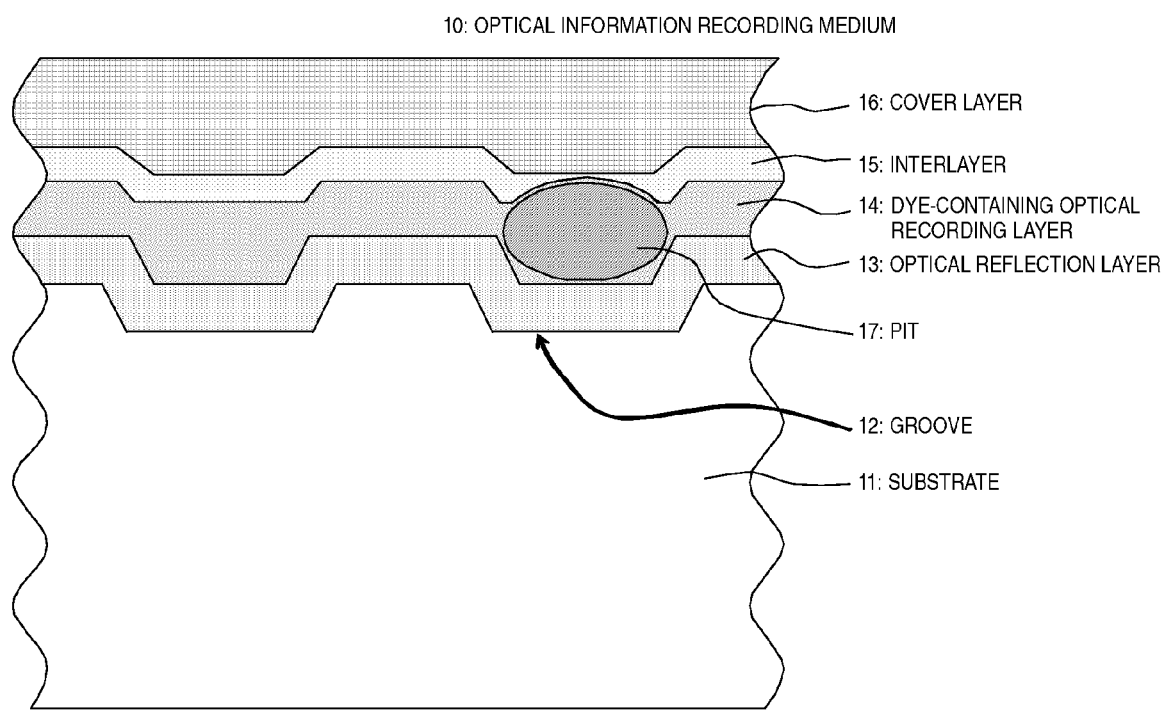

[FIG. 4]
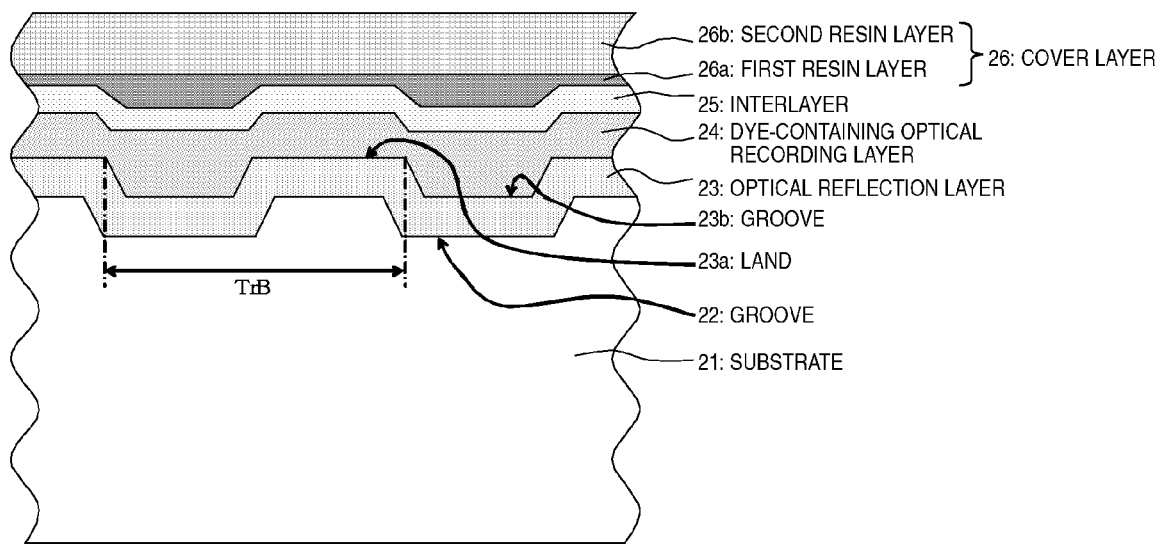

[FIG. 5] Background Art
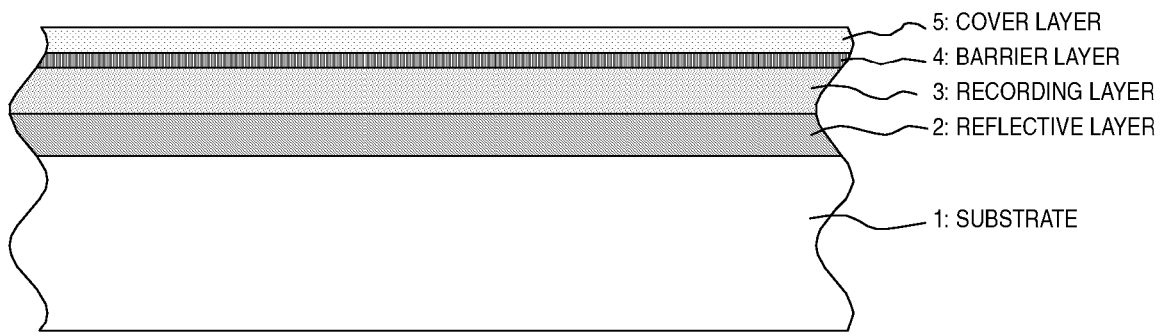

though the recording layer of the above optical information recording medium is a phase change type layer, also a dye-containing type recording layer has been studied.

OPTICAL INFORMATION RECORDING MEDIUM

BACKGROUND OF THE INVENTION

1. Field of the Invention

The present invention relates to an optical information recording medium, particularly to a high-recording-density optical information recording medium such as a Blu-ray disc having an optical recording layer containing an organic dye.

2. Description of the Related Art

Optical information recording media including optical disks have been widely used for information recording. For example, an optical information recording medium such as CD-R has a recording layer and a reflective layer formed in this order on an optically transparent resin substrate with a thickness of 1.2 mm and a diameter of 120 mm or 80 mm. In these years, there has been a demand for an optical information recording medium having a higher information recording density. Thus, use of a shorter laser wavelength (referred to as wavelength shortening) and use of an object lens having a higher numerical aperture (NA) (referred to as NA increasing) have been studied, and DVD±R and the like have been realized as such media. The DVD±R has two bonded 0.6-mm-thick optically transparent resin substrates, and has a reflective layer and a recording layer sandwiched between the substrates, so that the permissive tilt angle (tilt) value of the disc is increased by the wavelength shortening and the NA increasing.

Recently there has been a demand for a further higher information recording density in view of recording a high-definition viewdata. Thus, an optical information recording medium having a 1.1-mm-thick resin substrate, a reflective layer and a recording layer formed on the substrate, and a 0.1-mm-thick optically transparent cover layer formed on the reflective and recording layers has been proposed. Examples of the medium include a write-once type of Blu-ray Disc (registered trademark, hereinafter referred to as BD), BD-R (BD-Rewritable). Specifically, the medium has a disc-shaped substrate having an outer diameter of 120 mm, an inner diameter of 15 mm, and a thickness of approximately 1.1 mm, and further has an optical reflection layer, a phase change recording layer, and a cover layer having a thickness of approximately 0.1 mm on the substrate. The medium is capable of recording user information on the recording layer by irradiating the cover layer side with a laser light having a wavelength of approximately 405 nm from an optical head having a numerical aperture of approximately 0.85.

Though the recording layer of the above optical information recording medium is a phase change type layer, also a dye-containing type recording layer has been studied.

However, the dye-containing recording layer is disadvantageous in that, for example, when a transparent resin material is applied to the recording layer to form the cover layer, the coating liquid penetrates into the dye-containing recording layer.

In contrast, as shown in FIG. 5, in an optical recording medium proposed in JP-A-2003-36562, a reflective layer 2, a dye-containing recording layer 3, and a cover layer 5 are disposed on a substrate 1 to achieve recording/playback on the cover layer 5 side, and a barrier layer 4 for preventing mixing of the recording layer 3 and the cover layer 5 is formed between the recording layer 3 and the cover layer 5. The barrier layer 4 may contain at least one selected from silicon oxide, zinc sulfide, zinc oxide, silicon nitride, silicon carbide, cerium oxide, yttrium oxide, yttrium sulfide, and mixtures of an oxide and sulfur.

However, as described in JP-A-2003-36562, the optical recording medium is disadvantageous in that when the barrier layer 4 contains a sulfur-containing material, the sulfur is reacted with a metal (such as Ag) in the reflective layer 2, so that a sulfide is generated to deteriorate the preserving property.

Meanwhile, in an optical recording medium proposed in JP-A-2006-147135, at least a cover layer and a recording layer containing an organic dye are disposed on a substrate, and an interlayer with a thickness of 1 to 80 nm, composed of a Ta compound, an Nb compound, or a composite oxide containing Ta and/or Nb, is disposed between the recording layer and the cover layer. The interlayer may be formed by an RF sputtering method or a DC sputtering method.

However, the optical information recording medium proposed in JP-A-2006-147135, which has the interlayer composed of the Ta compound, the Nb compound, or the composite oxide containing Ta and/or Nb such as a composite oxide containing 70 atm % of $Nb_2O_5$ and 30 atm % of $Al_2O_3$, has the following disadvantages. Specifically, the electric conductivity of a target of the composite oxide containing 70 atm % of $Nb_2O_5$ and 30 atm % of $Al_2O_3$ is changed depending on the oxygen deficiency state of the target. For example, in a case where the target has no oxygen deficiency, the target is a perfect insulator, whereby the interlayer can be formed by the RF sputtering method using the target only at a low film formation speed on the dye-containing recording layer. Thus, in this case, the optical information recording medium cannot be easily produced, and cannot be practically used in view of the production. On the other hand, in a case where the target has oxygen deficiency and thereby has electric conductivity, abnormal discharge is often caused between the target and the interlayer in an RF sputtering machine under a high-frequency voltage applied between a vacuum chamber and the target. In this case, a groove-like scratch is generated on a surface of the interlayer composed of the composite oxide due to the abnormal discharge, and is found as an appearance failure in the optical information recording medium after forming the cover layer. Furthermore, immediately before and after the abnormal discharge, the voltage applied to the target is changed, whereby the interlayer cannot be formed at a constant speed, the resultant interlayer has an uneven film state, and the optical information recording medium cannot be stably produced.

SUMMARY OF THE INVENTION

As a result of intense research, the inventors have found that, by controlling the composition of the interlayer within a predetermined range, the abnormal discharge can be inhibited in the formation of the interlayer to reduce the scratch on a surface of the interlayer. Further, the inventors have found that, when the target used in the RF sputtering method is not a perfect insulator and has a resistivity controlled within a predetermined range, the interlayer can be formed at a high film formation speed.

An object of at least one embodiment of the present invention is to provide an optical information recording medium that can be stably produced without causing an appearance failure due to scratch on a surface of an interlayer. Another object of at least one embodiment of the invention is to provide an optical information recording medium that can be easily produced by forming an interlayer at a high film formation speed.

In view of the above, an embodiment of the invention provides (1) an optical information recording medium comprising an optical reflection layer, an optical recording layer containing an organic dye, an interlayer, and a cover layer formed in this order on a substrate, wherein the interlayer comprises a sputtered $Nb_2O_5$—$Al_2O_3$-based composite oxide having an $Nb_2O_5$ content of more than 50 mol % and less than 60 mol %. Thus, a scratch is hardly generated on the interlayer due to abnormal discharge between the interlayer and a sputtering target. By controlling the $Nb_2O_5$ content of the composite oxide within the range of more than 50 mol % and less than 60 mol % (e.g., 52 mol % to 58 mol % in an embodiment), a target can have a bulk resistivity of 1 to 5 Ω·cm (e.g., 1.1 to 3.5 Ω·cm in an embodiment) and can be stable during the process. When the $Nb_2O_5$ content of the composite oxide is 50 mol % or less or 60 mol % or more, a bulk resistivity of the target is difficult to fall within a range of 1 to 5 Ω·cm, and the target is difficult to be stable.

Thus, according to at least one embodiment of the invention, there is provided the optical information recording medium that can be stably produced without causing the appearance failure due to the scratch on the interlayer.

Another embodiments is (2) an optical information recording medium wherein the interlayer is formed by an RF sputtering machine using a target having a bulk resistivity of 1 to 5 Ω·cm, in addition to (1) described above. In this embodiment, the interlayer can be formed at a high film formation speed. Thus, according to the embodiment, there is provided the optical information recording medium that can be easily produced by forming the interlayer at a high film formation speed (e.g., 3.0 nm/sec to 10.0 nm/sec).

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 1 is a plan view showing the overall structure of an optical information recording medium according to a first embodiment of the present invention;

FIG. 2 is a partly enlarged cross-sectional view showing the internal structure of a region B surrounded by a dashed line in FIG. 1 in the optical information recording medium according to the first embodiment;

FIG. 3 is a partly enlarged cross-sectional view showing a pit formed by irradiating the optical information recording medium according to the first embodiment with a laser light;

FIG. 4 is a partly enlarged cross-sectional view showing the internal structure of an optical information recording medium according to a second embodiment of the invention; and FIG. 5 is a partly enlarged cross-sectional view showing an optical information recording medium according to a background art.

DESCRIPTION OF THE PREFERRED EMBODIMENTS

The present invention will be explained in detail with reference to preferred embodiments and drawings. However, the preferred embodiments and drawings are not intended to limit the present invention. In the disclosure, the "$Nb_2O_5$—$Al_2O_3$-based composite" or "$Nb_2O_5$—$Al_2O_3$ composite" means a composite oxide formed substantially from $Nb_2O_5$ and $Al_2O_3$ or formed from a material essentially consisting of $Nb_2O_5$ and $Al_2O_3$ (e.g., which may include impurities or other substance to the extent that the basic characteristics of the composite oxide are not materially altered). The sputtered interlayer is typically constituted by substantially the same components as the target.

A first embodiment of the optical information recording medium of the present invention will be described below with reference to FIGS. 1 and 2. FIG. 1 is a plan view showing the overall structure of an optical information recording medium 10 according to the first embodiment. FIG. 2 is a partly enlarged cross-sectional view showing a region B surrounded by a dashed line in FIG. 1 for explaining an internal structure according to the first embodiment.

As shown in FIG. 1, the optical information recording medium 10 of this embodiment has a hole at the center, and has a disc-shaped appearance with an outer diameter of approximately 120 mm, an inner diameter of approximately 15 mm, and a thickness of approximately 1.2 mm.

In the optical information recording medium 10, the internal structure of the region B surrounded by the dashed line in FIG. 1 is schematically shown in FIG. 2.

As shown in FIGS. 1 and 2, a substrate 11 has an annulus ring-shaped appearance with a spiral groove 12 formed on one main surface, and has a thickness of approximately 1.1 mm and comprises a resin.

An optical reflection layer 13 is formed on the one main surface of the substrate 11, and comprises a laser light-reflectable Ag alloy to be hereinafter described. On a surface of the optical reflection layer 13, opposite to the surface in contact with the grooved main surface of the substrate 11, a spiral groove 13b and an adjacent land 13a are formed at a track pitch TrB equal to that of the groove 12 of the substrate 11.

An optical recording layer 14 comprising an optical absorption material capable of absorbing a laser light with a wavelength of 400 to 420 nm (e.g. 405 nm) is formed on the optical reflection layer 13. For example, the optical absorption material contains an organic dye represented by the following chemical formula 1.

Chemical Formula 1

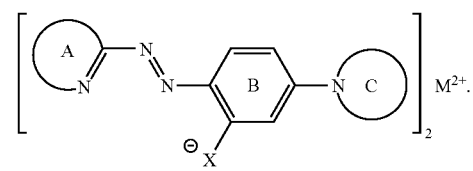

In the formula, the ring A represents a heterocycle containing the shown carbon atom and nitrogen atom, the ring B represents a benzene ring that may have a substituent, the ring C represents a heterocycle containing the shown nitrogen atom, the ring C may be bonded to the ring B, $X^-$ represents a group that may have an active hydrogen, and $M^{2+}$ represents a divalent positive metal ion. Thus, one $M^{2+}$ ion is bonded to two negative azo dye ions to form the metal complex.

An optically transparent interlayer 15 comprising an $Nb_2O_5$—$Al_2O_3$-based composite oxide is formed on the optical recording layer 14. For example, in the composite oxide, the mole ratio of $Nb_2O_5/(Nb_2O_5+Al_2O_3)$ may be 55 mol %. The interlayer 15 comprises the $Nb_2O_5$—$Al_2O_3$-based composite oxide, and the composite oxide has an $Nb_2O_5$ content of more than 50 mol % and less than 60 mol %. In the formation of the interlayer 15, by controlling the composition of the interlayer 15 as above, the interlayer 15 can be prevented from being scratched due to abnormal discharge between the interlayer 15 and a sputtering target. The interlayer 15 may be formed by an RF sputtering machine using a target having a bulk resistivity of 1 to 5 $\Omega \cdot cm$. By controlling the bulk resistivity of the target, the interlayer 15 can be formed at a high film formation speed.

Further, an optically transparent cover layer 16 comprising a transparent resin material is formed on the interlayer 15. The cover layer 16 has a thickness of approximately 0.1 mm.

When the optically transparent cover layer 16 side of the optical information recording medium 10 of this embodiment is irradiated with a laser light with a wavelength of 400 to 420 nm (e.g. 405 nm), the organic dye in the optical recording layer 14 absorbs the laser light and generates heat to form an optically readable pit 17 shown in FIG. 3. The interlayer 15 can be readily deformed to accelerate the formation of the pit 17 in this process, whereby the optical information recording medium 10 of this embodiment can appropriately record user information.

A preferred embodiment of the substrate 11 will be described below. The substrate 11 may comprise a material selected from various known substrate materials for conventional optical information recording media. Specific examples of the materials include polycarbonates; acrylic resins such as polymethyl methacrylates; vinyl chloride based resins such as polyvinyl chlorides and vinyl chloride copolymers; epoxy resins; amorphous polyolefins; polyester resins; metals such as aluminum; and glasses. The materials may be used in combination if necessary. Among the materials, the thermoplastic resins are preferred, and the polycarbonates are particularly preferred, in view of formability, humidity resistance, size stability, low cost, etc.

The above resin is preferably injection-molded to a predetermined shape to form the substrate 11. In the case of producing an optical disk, the substrate 11 preferably has an annulus ring shape. The substrate 11 preferably has a thickness of 0.9 to 1.1 mm. In the injection molding for forming the substrate 11, it is preferred that a template (a so-called stamper) is placed in a metal mold, a spiral convex portion having a reverse pattern to the groove 12 being microfabricated on one main surface of the template. By using the template, the spiral groove 12 can be simultaneously formed in the injection molding. The groove 12 is generally formed at a pitch of 0.35 μm or 0.32 vm. The substrate 11 is not limited to the embodiment, and for example the substrate 11 may be obtained by the steps of applying an ultraviolet curable resin to a base, hardening the applied resin, and removing the base.

A preferred embodiment of the optical reflection layer 13 will be described below. The optical reflection layer 13 is for reflecting a laser light for data recording and/or playback. In the invention, it is preferred that the optical reflection layer 13 is formed between the substrate 11 and the optical recording layer 14 to increase the reflectance for the laser light or to improve the recording/playback characteristic. The optical reflection layer 13 is preferably a metallic thin film having a high reflectance, and materials for the film include metals such as Au, Al, Ag, Cu, and Pd; alloys of the metal such as Ag alloys and Al alloys; and alloys of the metal doped with a trace constituent. The optical reflection layer 13 is preferably formed on the grooved surface of the substrate 11 by a deposition method, an ion plating method, a sputtering method, etc. Among the methods, the sputtering method is particularly preferred from the viewpoints of mass productivity and cost. On a surface of the optical reflection layer 13, opposite to the surface in contact with the grooved main surface of the substrate 11, the spiral groove 13b is preferably formed at a track pitch equal to that of the groove 12 of the substrate 11. It is preferred that the optical reflection layer 13 is formed with a uniform thickness by a sputtering method, etc. on the spirally grooved main surface of the substrate 11 to obtain the groove 13b.

A preferred embodiment of the optical recording layer 14 will be described below. The optical recording layer 14 preferably comprises an optical absorption material containing an organic dye capable of absorbing a laser light. The optical recording layer 14 is particularly preferably such a dye type optical recording layer that a pit is formed to record data under the irradiation with the laser light. The organic dye is preferably a phthalocyanine dye, a cyanine dye, an azo dye, etc. For example, the optical recording layer 14 is preferably formed by the steps of: dissolving an azo dye represented by the following chemical formula 1 or 2 or a cyanine dye represented by the following chemical formula 3 with a binder or the like in a solvent such as TFP (tetrafluoropropanol) to prepare a coating liquid; applying the coating liquid to the optical reflection layer on the substrate 11 using a spin coat method or a screen printing method to form a coating layer; and drying the coating layer at 80° C. for 30 minutes.

Chemical Formula 1

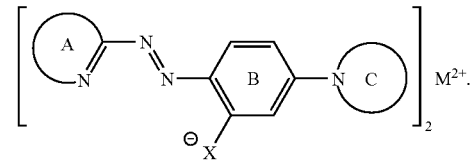

In the formula, the ring A represents a heterocycle containing the shown carbon atom and nitrogen atom, the ring B represents a benzene ring that may have a substituent, the ring C represents a heterocycle containing the shown nitrogen atom, the ring C may be bonded to the ring B, $X^-$ represents a group that may have an active hydrogen, and $M^{2+}$ represents a divalent positive metal ion. Thus, one $M^{2+}$ ion is bonded to two negative azo dye ions to form the metal complex.

Chemical Formula 2

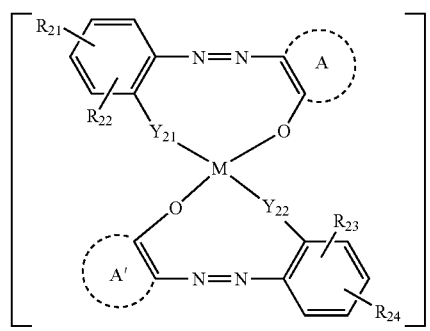

In the formula, A and A' represent the same or different heterocycles containing one or more heteroatoms selected from nitrogen, oxygen, sulfur, selenium, and tellurium atoms, $R_{21}$ to $R_{24}$ independently represent a hydrogen atom or a substituent, and $Y_{21}$ and $Y_{22}$ represent the same or different heteroatoms selected from Group 16 atoms of the periodic table.

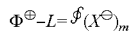 Chemical Formula 3

In the formula, $\Phi^+$ and $\phi$ independently represent an indolenine ring residue, a benzoindolenine ring residue, or a dibenzoindolenine ring residue, L represents a linking group for forming a mono- or di-carbocyanine dye, $X^-$ represents a negative ion, and m is an integer of 0 or 1.

A preferred embodiment of the interlayer 15 will be described below. The interlayer 15 is preferably formed between the optical recording layer 14 and the cover layer 16 to be hereinafter described with a purpose of preventing mixing of the optical recording layer 14 and the cover layer 16, etc.

The interlayer 15 preferably comprises the $Nb_2O_5$—$Al_2O_3$-based composite oxide having an $Nb_2O_5$ content of more than 50 mol % and less than 60 mol %. The interlayer 15 preferably has optical transparency, and is preferably formed on the optical recording layer 14 by a deposition method, an ion plating method, a sputtering method, etc. Among the methods, a sputtering method using an RF sputtering machine is particularly preferred from the viewpoints of mass productivity and cost. In the RF sputtering machine, an alternating voltage (a high-frequency voltage; e.g., 13.56 MHz) is applied between an electrically conductive vacuum chamber and a target. Electrons in the target cannot escape, and thus the electron density of the target is increased. As a result, the target is negatively biased, ions are drawn to and collide against the target, and the composite oxide particles are ejected from the target by the ions. The ejected composite oxide particles collide against and adsorb onto the optical recording layer 14 on the substrate 11 to form the interlayer 15. In the case of using a conventional low-resistance target comprising a composite oxide with an $Nb_2O_5$ content of 70 mol % in the sputtering method, abnormal discharge is often caused between the target and the deposited composite oxide interlayer. In the invention, the composite oxide with an $Nb_2O_5$ content of more than 50 mol % and less than 60 mol % has a resistance higher than that of the conventional composite oxide, whereby the abnormal discharge can be prevented between the target and the deposited interlayer 15. In embodiments of the sputtering method for forming the interlayer 15 by the RF sputtering machine, the inner pressure of the vacuum chamber is preferably $1\times10^{-2}$ to $1\times10^{-5}$ torr (gas such as Ar may be introduced), the sputtering speed is preferably 0.1 to 20 nm/sec, and the sputtering power is preferably 0.2 to 5.0 kW. The thickness of the interlayer may be 10 nm to 50 nm in an embodiment.

The interlayer 15 is preferably formed by an RF sputtering machine using a target having a bulk resistivity of 1 to 5 Ω·cm.

For example, the bulk resistivity of the target is preferably controlled within a range of 1 to 5 Ω·cm by causing oxygen deficiency in the composite oxide of the target.

For example, the oxygen deficiency can be purposefully caused in the composite oxide by carrying out a sintering process in a vacuum or reducing atmosphere in preparation of the composite oxide by burning.

Further, the oxygen deficiency can be purposefully caused by using all or part of a component for the composite oxide in form of metal powder, not oxide or carbonate powder, and by burning the component in a vacuum or oxygen-free atmosphere.

A preferred embodiment of the cover layer 16 will be described below. The cover layer 16 preferably comprises an optically transparent resin, and is preferably formed by applying an ultraviolet curable resin using a spin coat method, etc. The cover layer 16 preferably has a thickness of 0.1 mm so that data can be recorded and/or read on the optical recording layer 14 under irradiation with a laser light with a wavelength of about 400 to 420 nm (e.g. 405 nm). The light transmittance of the cover layer 16, measured by a spectrophotometer using a light with a wavelength of about 400 to 420 nm (e.g. 405 nm), is preferably 70% or more, more preferably 80% or more, per 0.1 mm of a cured layer thickness. The cover layer 16 is not limited to the embodiment, and a sheet of an optically high-transparent resin such as a polycarbonate resin or an acrylic-based resin, having a thickness of approximately 0.1 mm, may be bonded as the cover layer 16 to the interlayer 15 using an adhesive mainly composed of a transparent ultraviolet curable resin or a transparent reactive curable resin such as an epoxy resin.

In the present disclosure where conditions and/or structures are not specified, the skilled artisan in the art can readily provide such conditions and/or structures, in view of the present disclosure, as a matter of routine experimentation. Also, in the present disclosure, the numerical numbers applied in specific embodiments can be modified by a range of at least ±50% in other embodiments, and the ranges applied in embodiments may include or exclude the endpoints.

EXAMPLES

Examples of the optical information recording medium 10 according to the embodiment of the present invention will be described below.

Example 1

A photoresist (a photosensitizer) was applied to a glass board to a predetermined thickness by a spin coat method to form a resist film. The resist film was exposed to a laser light from a cutting machine in a predetermined exposure width size. A developer was dropped onto the resultant glass board, and a developing treatment was carried out to form a convex resist pattern corresponding to a groove of a substrate for a disc-shaped optical information recording medium.

Nickel was deposited on the glass board by a plating treatment, and the plated layer was peeled off and trimmed into a disc shape to obtain a stamper.

The stamper was set in a cavity of an injection molding machine, and a polycarbonate resin was injected into the cavity to obtain a substrate 11 having a spiral groove 12 on one main surface.

An Ag alloy was sputtered to a uniform thickness onto the spirally grooved main surface of the substrate 11 using a sputtering machine, to form a 100-nm-thick optical reflection layer 13 having a spiral groove 13b corresponding to the groove 12 of the substrate 11. The spiral groove 13b was formed on a surface of the optical reflection layer 13, opposite to the surface in contact with the grooved main surface of the substrate 11.

A dye solution containing an organic azo dye represented by the general chemical formula 1 was applied to a thickness of 60 nm onto the resultant substrate by a spin coat method, and the applied solution was dried to form an optical recording layer 14.

A target composed of an $Nb_2O_5$—$Al_2O_3$-based composite oxide having an $Nb_2O_5$ content of 55 mol % and a bulk resistivity of 1.4 Ω·cm was sputtered onto the resultant substrate by an RF sputtering machine at a sputtering power of 2.0 kW, to form a 25-nm-thick interlayer 15 composed of an $Nb_2O_5$—$Al_2O_3$-based composite oxide having an $Nb_2O_5$ content of approximately 55 mol %.

Then, an ultraviolet curable resin was applied to the resultant substrate by a spin coat method, and the applied resin was hardened under UV irradiation to form a 0.1-mm-thick cover layer 16, whereby an optical information recording medium 10 was produced.

The appearance of the produced optical information recording medium 10 was visually observed from the cover layer 16 side. As a result, a scratch or the like corresponding to abnormal discharge was not found. The optical information recording medium 10 was set in ODU-1000 manufactured by Pulstec Industrial Co., Ltd., an optical recording medium evaluation device equipped with a laser optical system having a wavelength of 405 nm and an NA of 0.85. On the optical information recording medium 10, 1-7 modulated random signals (2 T to 8 T) were recorded at a power of 5.5 mW and reproduced at a power of 0.35 mW to evaluate the electrical jitter characteristic. This process was carried out at a linear speed of 9.84 m/s using an optimized laser luminescence pattern in the recording. The optical information recording medium 10 had a jitter characteristic of 6.5%, measured by the above optical recording medium evaluation device. The film formation speed was 3.43 nm/sec, and was stable even during the discharge.

Example 2

An optical information recording medium of Example 2 was produced and evaluated in the same manner as Example 1 except that a target composed of an $Nb_2O_5$—$Al_2O_3$-based composite oxide having an $Nb_2O_5$ content of 58 mol % and a bulk resistivity of 1.2 Ω·cm was used to form an interlayer composed of an $Nb_2O_5$—$Al_2O_3$-based composite oxide having an $Nb_2O_5$ content of 58 mol %. As a result of observing the appearance of the optical information recording medium, a scratch or the like corresponding to abnormal discharge was not found as Example 1. The optical information recording medium had a jitter characteristic of 6.8%. The film formation speed was 3.40 nm/sec, and was stable even during the discharge.

Example 3

An optical information recording medium of Example 3 was produced and evaluated in the same manner as Example 1 except that a target composed of an $Nb_2O_5$—$Al_2O_3$-based composite oxide having an $Nb_2O_5$ content of 53 mol % and a bulk resistivity of 3.0 Ω·cm was used to form an interlayer composed of an $Nb_2O_5$—$Al_2O_3$-based composite oxide having an $Nb_2O_5$ content of 53 mol %. As a result of observing the appearance of the optical information recording medium, a scratch or the like corresponding to abnormal discharge was not found as Example 1. The optical information recording medium had a jitter characteristic of 6.8%. The film formation speed was 3.55 nm/sec, and was stable even during the discharge.

Comparative Example 1

Ten optical information recording media of Comparative Example 1 were produced and evaluated in the same manner as Example 1 except that a target composed of an $Nb_2O_5$—$Al_2O_3$-based composite oxide having an $Nb_2O_5$ content of 65 mol % and a bulk resistivity of 0.4 Ω·cm was used to form an interlayer composed of an $Nb_2O_5$—$Al_2O_3$-based composite oxide having an $Nb_2O_5$ content of 65 mol %. Although the film formation speed was 6.0 nm/sec, as a result of observing the appearance of the optical information recording media, a scratch corresponding to abnormal discharge (for example having a width of 7 mm and a length of 5 mm) was found in all the ten media. The optical information recording medium had a jitter characteristic of 7.5%.

Comparative Example 2

An optical information recording medium of Comparative Example 2 was produced and evaluated in the same manner as Example 1 except that a target composed of an $Nb_2O_5$—$Al_2O_3$-based composite oxide having an $Nb_2O_5$ content of 70 mol % and a bulk resistivity of 1.0 E+08 Ω·cm (an insulator) was used to form an interlayer composed of an $Nb_2O_5$—$Al_2O_3$-based composite oxide having an $Nb_2O_5$ content of 70 mol %. As a result, the film formation speed was 0.90 nm/sec, which was remarkably lower than those of Examples. Thus, the optical information recording medium was not practical in view of productivity.

Comparative Example 3

An optical information recording medium of Comparative Example 3 was produced and evaluated in the same manner as Example 1 except that a target composed of an $Nb_2O_5$—$Al_2O_3$-based composite oxide having an $Nb_2O_5$ content of 50 mol % and a bulk resistivity of 1.0 E+08 Ω·cm (an insulator) was used to form an interlayer composed of an $Nb_2O_5$—$Al_2O_3$-based composite oxide having an $Nb_2O_5$ content of 50 mol %. As a result, the film formation speed was 0.80 nm/sec, which was remarkably lower than those of Examples. Thus, the optical information recording medium was not practical in view of productivity.

A second embodiment of the optical information recording medium of the invention will be described below with reference to FIG. 4. FIG. 4 is a partly enlarged cross-sectional view showing the internal structure of an optical information recording medium 20 according to the second embodiment.

Though the cover layer 16 has a single-layer structure in the optical information recording medium 10 of the above first embodiment, the cover layer used in the invention is not limited thereto. For example, as shown in FIG. 4, a cover layer 26 may have a bilayer structure containing a first optically transparent resin layer 26a and a second optically transparent resin layer 26b. The first resin layer 26a may be an ultraviolet curable adhesive layer, and the second resin layer 26b may be a polycarbonate sheet having a thickness of less than 0.1 mm (e.g. 0.075 mm). In this case, the total thickness of the first resin layer 26a and the second resin layer 26b is preferably 0.1 mm.

The optical information recording medium 20 of this embodiment is different from the optical information recording medium 10 of the first embodiment only in that the cover layer 26 has the bilayer structure containing the first optically transparent resin layer 26a and the second optically transparent resin layer 26b. The other components of the optical information recording medium 20 are equal to those of the first embodiment, and thus explanations therefor are omitted.

The present application claims priority to Japanese Patent Application No. 2007-261468, filed Oct. 5, 2007, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium comprising an optical reflection layer, an optical recording layer containing an organic dye, an interlayer, and a cover layer formed in this order on a substrate, wherein the interlayer comprises a sputtered $Nb_2O_5$—$Al_2O_3$-based composite oxide having an $Nb_2O_5$ content of more than 50 mol % and less than 60 mol %.

2. The optical information recording medium according to claim 1, wherein the interlayer consists of the sputtered $Nb_2O_5$—$Al_2O_3$-based composite oxide.

3. The optical information recording medium according to claim 1, wherein the $Nb_2O_5$—$Al_2O_3$-based composite oxide is a $Nb_2O_5$—$Al_2O_3$ composite oxide formed substantially of $Nb_2O_5$ and $Al_2O_3$.

4. The optical information recording medium according to claim 1, which has no detectable scratch indicative of the occurrence of abnormal discharge during sputtering.

5. A method of producing the optical information recording medium according to claim 1, comprising:

providing a target of a $Nb_2O_5$—$Al_2O_3$-based composite oxide having a bulk resistivity of 1 to 5 Ω·cm; and RF sputtering the target and depositing the interlayer on the optical recording layer.

6. The method according to claim 5, wherein the target has an $Nb_2O_5$ content of more than 50 mol % and less than 60 mol %.

7. The method according to claim 5, wherein the interlayer is deposited at a rate of 3 nm/sec or higher.

* * * * *